United States Patent [19]

Hundebol

[11] Patent Number: 5,026,275
[45] Date of Patent: Jun. 25, 1991

[54] REDUCTION OF NITROGEN OXIDE ($NO_x$) EMISSION FROM A KILN PLANT

[75] Inventor: Soren Hundebol, Valby, Denmark

[73] Assignee: F. L. Smidth & Co. A/S, Valby, Denmark

[21] Appl. No.: 504,536

[22] Filed: Apr. 4, 1990

[30] Foreign Application Priority Data

Apr. 5, 1989 [DK] Denmark .............................. 1630/89

[51] Int. Cl.$^5$ ............................................ F27B 15/00
[52] U.S. Cl. ....................................... 432/14; 432/106
[58] Field of Search ............................ 432/58, 14, 106

[56] References Cited

U.S. PATENT DOCUMENTS

| | | | |
|---|---|---|---|
| 4,514,170 | 4/1985 | Kupper | 432/106 |
| 4,548,580 | 10/1985 | Hatano et al. | 432/106 |
| 4,557,688 | 12/1985 | Nielsen | 432/106 |
| 4,561,842 | 12/1985 | Nielsen | 432/106 |
| 4,568,276 | 2/1986 | Fujisawa | 432/14 |
| 4,623,311 | 11/1986 | Hatano et al. | 432/106 |
| 4,715,811 | 12/1987 | Lawall | 432/58 |

Primary Examiner—Henry C. Yuen
Attorney, Agent, or Firm—Brumbaugh, Graves, Donohue & Raymond

[57] ABSTRACT

In a kiln plant for burning mineral raw materials, e.g. cement raw materials, by means of nitrogen containing, solid fuel, e.g. coal, and which plant comprises a kiln (1), a material cooler (2) coupled after the kiln and a multistring, multistage preheater (18-27 and 18'-27') mounted before the kiln, the one string, the kiln string (18-27), being in direct connection with the kiln riser pipe (8) and the second string, the calcining string (18'-27'), being connected to a separate calcinator (4) to which combustion air is supplied in the form of spent cooler air through an inlet (7), an $NO_x$-reducing zone is established in the kiln riser pipe (8) and a part of the kiln string from an inlet (13) for nitrogen containing solid fuel of a fuel duct (10) and an inlet (12) of a branch-off (14) for the supply of spent cooler air. The length of the $NO_x$-reducing zone, the combustion in the zone of the supplied carbon containing fuel for reaction between nitrogen atoms (N) and the nitrogen oxide (NO) formed in the kiln for forming harmless nitrogen ($N_2$) and the separation of non-combusted fuel with partially calcined raw materials from the kiln smoke gases in the cyclone stage (18), and the further treatment of said products in the calciner (4) where the combustion of the fuel supplied from the kiln riser pipe and having a reduced nitrogen content thus causing a reduction of the $NO_x$-emission from the calciner string (18'-27'), ensure a high degree of reduction in the total $NO_x$-emission from the plant.

3 Claims, 1 Drawing Sheet

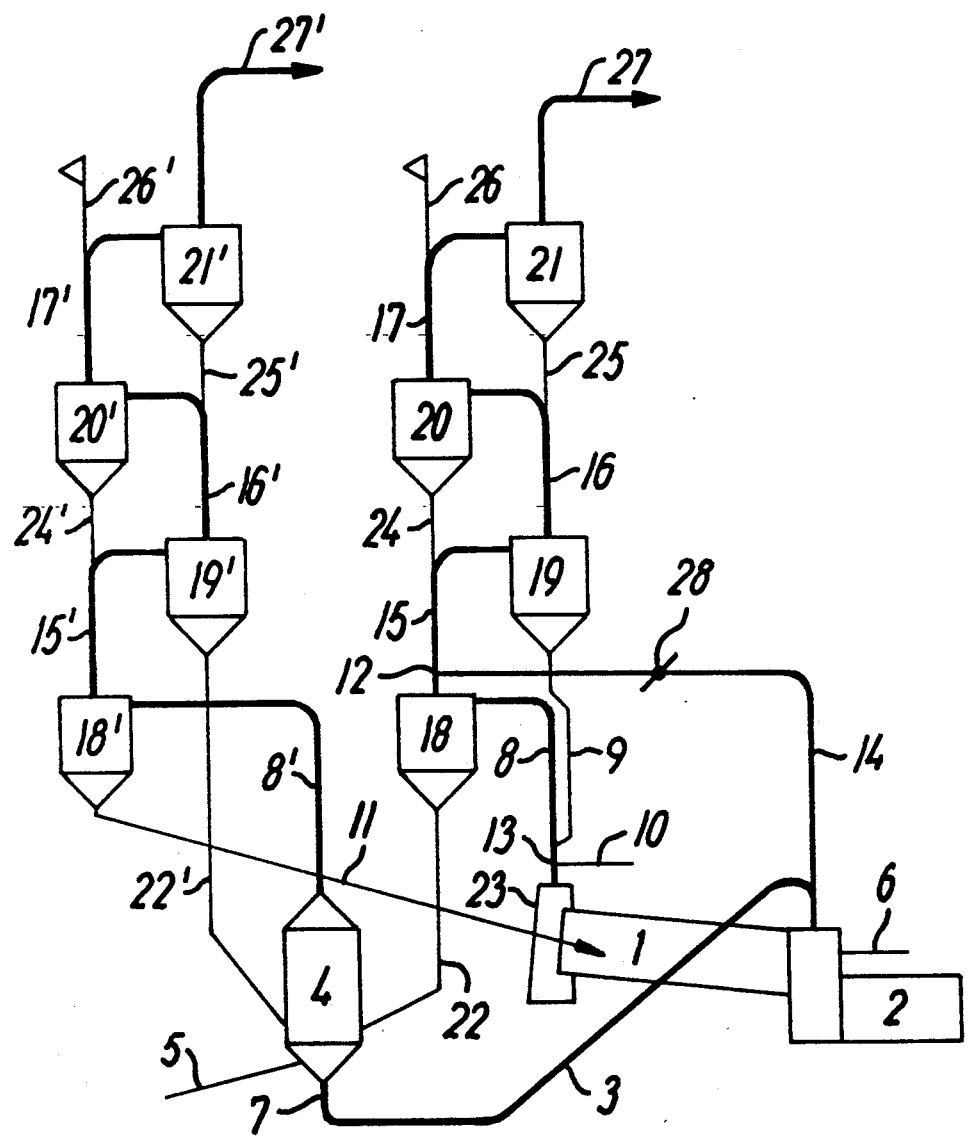

REDUCTION OF NITROGEN OXIDE (NO$_x$) EMISSION FROM A KILN PLANT

BACKGROUND OF THE INVENTION

The invention relates to a method and a plant for reducing the nitrogen oxide (NO$_x$) emission from a kiln plant for burning mineral raw materials, e.g. cement raw materials, which plant comprises at least two separate, multistage preheater strings, the one comprising a separate precalcining zone with a separate fuel inlet, whereas the other(s) is (are)—as seen in the raw material feed direction through the plant—coupled immediately before the kiln and connected to the latter by a kiln riser pipe, and in which plant air/smoke gas is carried through each separate string by means of a fan mounted in each string, the string with the precalcining zone being provided with air in the form of spent cooler air from a material cooler mounted after the kiln, whereas the kiln string(s) is (are) provided with hot smoke gas directly from the kiln.

Depending on the fuel type used a certain amount of nitrogen oxide (NO) is generated in such plants, viz. in the kiln burning zone, in the kiln riser pipe (if firing is effected herein) and in the separate precalcining zone, respectively, and in order to comply with the requirements for limiting air pollution, which are becoming increasingly restrictive in the industrialized countries, it will be necessary to take measures i.a. to limit the NO$_x$-emission from the plants in question.

The NO$_x$-emission consists primarily of the simple compound NO which, according to its origin, may be divided into two categories:

1. Thermal NO the nitrogen atom of which originates from the N$_2$ content of the combustion air. N$_2$ which comprises two nitrogen atoms is a very stable compound which is only split at very high temperatures. Therefore thermal NO is almost exclusively formed in the burning zone of a kiln and only to a small degree in a separate calciner.

2. Fuel NO where the nitrogen atom originates from the fuel. Coal, a commonly used fuel in the kiln plants described above, typically contains 1-1.5 weight % of nitrogen. Heavy fuel oil typically 0.4%, petro coke considerably more.

The NO formed in a separate calciner of a kiln plant is primarily fuel NO.

If coal is used as fuel and is consequently subjected to closer chemical examination it is found that the nitrogen atoms are always positioned separately and scattered in the very large molecules of the coal. This is the reason why, to a very large extent, the nitrogen atoms convert to NO during combustion of the coal as the nitrogen atoms, having been positioned in pairs, would otherwise be emitted in the form of N$_2$ during the combustion.

In the light of this it might reasonably be assumed that for each nitrogen atom N contained in the fuel an NO-molecule would be produced. However, this is not the case, in that "only" 20-50% of the added N atoms are converted into NO-molecules during e.g. calciner firing.

This is due to the N-atoms not being removed directly from the solid coal by oxygen as this would mean a 100% conversion. The N-atoms would appear to form a part of small molecules or radicals detached from the solid coal. The N-atoms transported in this way reacts with oxygen thereby forming NO but, likewise, they react readily with NO, if present, thereby forming N$_2$. such N$_2$, however, cannot be split again at the temperatures prevailing in a calciner.

Consequently, one way of explaining it is that N-atoms, when removed as gas, may take two routes:

I. They may react with O$_2$ thereby forming NO.
II. They may react with NO thereby forming N$_2$.

On this basis it would be obvious to try to remove all oxygen present during the entire process, i.e. by burning at a low oxygen excess thereby stopping process (I), but, of course, such an approach is not feasible, the point being that the coal should burn. When consequently a certain amount of NO is produced in process (I) a subsequent process (II) may also take its course thereby removing a considerable part of the NO.

It will appear that the factor which in a kiln riser pipe removes some of the thermal NO produced in large amounts in the burning zone of a kiln is not the low excess air factor as such, but the addition of a nitrogen reducing agent, e.g. an N-containing fuel, in combination with the near-complete absence of O$_2$. Moreover the NO-removal occurring will be directly proportional to the fuel fed to the riser pipe due to a one-to-one combination of NO and N-atoms from the fuel.

If, accordingly, the problem associated with the attempts to reduce the NO-production is considered for a separate calciner, the solution suggested by the hitherto known technique would be to establish low excess air conditions within the calciner. This, however, would concurrently cause the combustion of the fuel, e.g. coal, in the calciner to be discontinued and therefore this solution has never been employed.

U.S. Pat. No. 4,080,218 discloses a singlestring kiln plant wherein the riser pipe mounted immediately after the kiln is constructed as a combined precalciner and NO$_x$-reducing zone which is at the bottom delimited by an inlet for supplying an NO$_x$-reducing agent, e.g. coal, positioned at a level approximately identical to that of the inlet for preheated raw materials from the penultimate preheater stage, and it is at the top delimited by an inlet for combustion air or tertiary air in the form of spent cooler air, and in which plant a separator cyclone after the riser pipe may be provided with an air inlet to ensure sufficient combustion air for carrying out the precalcining which is effected partly in the riser pipe partly in the cyclone. It naturally follows that this combined solution consisting in having an NO$_x$-reducing zone and a precalciner in one and the same plant unit, viz. the kiln riser pipe, is not readily applicable for multistring plants where it is necessary to carry out the NO$_x$-reduction separately in the kiln string and the calciner string, respectively.

German publication No. DE 3100661 discloses another method and a single- or two-string plant for the reduction of the NO$_x$-emission from a rotary kiln plant also comprising a precalciner. According to this publication it is attempted to apply the method known from previous singlestring kiln systems for NO$_x$-reduction by establishing a low oxygen excess in the lowermost part of a precalcining zone, whereto the kiln smoke is also fed, and then add the lacking air at a later stage of the precalcining zone thereby establishing normal air excess conditions in the uppermost part of the zone, into a plant in which the precalcining process is divided into a real "precalcining stage" followed by a so-called "post-calcining stage".

Finally, DE 3.522.883 discloses a singlestring kiln plant having a separate calciner wherein an NO$_x$-reducing zone is established in the kiln riser pipe by means of a fuel firing and a tertiary air supply, but where, similarly to the plant according to DE 3,100,661, a separate precalcining zone is provided, and where special control means control the fuel and raw material supply to the $NO_x$-reducing zone depending on the $NO_x$-reduction obtainable with the added amount of tertiary air.

However, the drawbacks associated with the two latter known methods consist in that only a limited amount of fuel—in practice 10-15% of the total fuel supply to the kiln installation—can be fired into the kiln riser pipe for breaking down the NO produced in the kiln burning zone in the feeding of air to the top of the riser pipe to ensure a complete combustion in the lowermost or the penultimate preheating stage in the kiln string of unburned components in the exhaust gas. Since, however, this amount of air has to be limited to avoid an undesirable increase in the smoke gas temperature during a continued combustion further up in the preheater string and a resulting unwanted increase in the energy consumption of the plant, this amount of air automatically limits the amount of fuel which could be fed into the kiln riser pipe and consequently the $NO_x$-reduction obtainable in the latter.

The following are the findings of a calculated example based on information supplied by the applicant of DE 31100661 about the distribution of a given amount of N-containing fuel of 140 kg coal/ton of clinker to a two-string plant in feeding 40% of the coal to the rotary kiln, 10% to the kiln riser pipe and 50% to the calciner:

Without any firing into the riser pipe, about 40% of the fuel supplied to the plant would be fed to the kiln and about 60% to the calciner, which on the terms given would result in an emission of 1 kg NO/ton of clinker from the kiln and 0.4 kg NO/ton of clinker from the calciner. Since, however, a 10% fuel supply is fed to the riser pipe about 0.1 kg NO/ton of clinker is broken down therein due to the amount of N added. Thus the kiln string emits 0.90 kg NO/ton of clinker. The calciner's fuel-NO production is slightly lower, only 50% compared to the normal 60% being fired to the calciner. The NO-emission from the latter is consequently 50/60×0.4 kg NO/ton of clinker=0.33 kg NO/ton of clinker and the total NO-emission from the plant amounts to 0.90+0.33=1.23 kg NO/ton of clinker as compared to an emission without any reduction of 1+0.4=1.40 kg NO/ton of clinker, i.e. a fairly modest reduction. A substantial reason for this is that, in practice, it is only possible in such a plant to add about 10% of the total fuel supply to the kiln riser pipe, a factor which sets the limit to the obtainable $NO_x$-reduction.

SUMMARY OF THE INVENTION

Therefore, it is the object of the invention to provide a method and a plant for reducing the $NO_x$-emission during the burning of mineral raw materials and which is not associated with the drawbacks described above.

The object is achieved in a method for obtaining the desired reduction of nitrogen oxide ($NO_x$) emission from a kiln plant for burning mineral raw materials, e.g. cement raw materials, using a nitrogen containing fuel, e.g. coal, the plant having a burning zone, a precalcining zone established before the burning zone for precalcining of the fed raw materials prior to their burning in the burning zone, and a multistring, multistage preheater mounted before the burning zone/the calcining zone for preheating the raw materials by heat exchange between the latter and the exhaust smoke gases from the burning zone and/or the precalcining zone, the preheating zone consisting of at least two strings, viz. a kiln string in direct connection with a kiln riser pipe and a calciner string connected to a separate precalciner, to which combustion air is introduced in the form of spent cooler air from a material cooling zone coupled after the kiln, and in which plant the supplied raw materials after preheating in the kiln string and the calciner string, respectively, are carried to the separate precalcining zone for final calcining in the latter, prior to the bulk of the raw materials being fed to the burning zone for further treatment therein, and in which plant the kiln riser pipe constitutes a part of an $NO_x$-reducing zone for the kiln smoke gas, and where raw materials from the kiln string and nitrogen containing solid fuel in an amount exceeding the amount combustible in the kiln riser pipe using the oxygen remaining in the kiln smoke gas are introduced into the kiln riser pipe above an outlet for smoke gas from the burning zone, the method being characterized in that the $NO_x$-reduction is carried out by the addition of nitrogen containing solid fuel to the kiln riser pipe, the amount of added fuel constituting from 20% to 50% of the total amount of solid fuel supplied to the plant, thereby making the nitrogen amount introduced into the kiln riser pipe together with the fuel to react with the nitrogen oxide (NO) generated in the burning zone for forming harmless nitrogen ($N_2$), whereupon the non-combusted fuel which now contains less nitrogen is separated from the smoke gases in the lowermost preheater stage of the kiln string and is conveyed to and combusted in the calcining zone, thereby limiting the total $NO_x$ emission from the plant to a level below 1.0 kg NO/ton of clinker.

The method is further characterized in that the $NO_x$-reducing zone established in the riser pipe immediately after the burning zone also comprises the lowermost preheater stage and a part of the riser pipe between the lowermost and the penultimate preheater stage in the kiln string for establishing in the reduction zone a retention time of a sufficient length for the treated product to ensure an efficient breaking down of the nitrogen oxide contained in the kiln smoke gas.

The object is further achieved in a kiln plant for carrying out the method and comprising a kiln before which—as seen in the movement direction of the supplied raw materials—a precalcining zone and at least two multistage preheater strings are established, viz. a kiln string which is in direct connection with the kiln riser pipe and a calcining string connected to a separate precalciner which is supplied with combustion air in the form of spent cooler air from a material cooler coupled after the kiln, and in which plant the kiln riser pipe is provided with supply means for combustion air, fuel and preheated raw materials, respectively, and which kiln plant is characterized in that a supply duct for tertiary air in the form of cooler air for the kiln string at the duct inlet proper opens into at the kiln string between the lowermost and the penultimate preheater stage.

Thus, the surprisingly novel aspect of the invention is that a very effective breaking down of the rotary kiln NO is achieved by establishing an $NO_x$-reduction zone comprising the entire kiln riser pipe and the lowermost preheater stage in the kiln string and by supplying extra combustion air in the form of spent cooler air (tertiary air) between the lowermost and the penultimate preheater stage as compared to the hitherto known technique where this supply is effected in the upper part of the kiln riser pipe, and by adding 20-50% of the total amount of fuel to the plant in the kiln riser pipe thereby obtaining a very effective breaking down of the rotary kiln NO, due to the supply of large amounts of the N-atoms required for this breaking down. Also a far larger amount of solid fuel is supplied hereby to the riser pipe than the amount corresponding to the $O_2$ content which may be left in the rotary kiln exhaust gas and in the atmospheric air which may optionally have entered through the kiln sealings, but as the major part of non-combusted fuel is separated from the smoke gases in the lowermost preheater stage and from there conveyed to the separate calciner where the fuel may burn completely in a normal air supply, only a limited amount of air has to be supplied between the lowermost and the penultimate preheater stage to avoid the presence of non-combusted components in the exhaust gas from the kiln. Furthermore the method according to the invention comprises a smaller-than-usual supply of fuel-N to the calciner due to some of the fuel nitrogen in the kiln riser pipe having already reacted with the NO produced in the kiln to form harmless $N_2$ which is hence removed through the kiln string before the supply to the calciner of this fuel thereby reducing the calciner's total fuel-NO production accordingly.

An inevitable slight temperature rise in the kiln string caused by combustion of gaseous pyrolysis products and remaining fine coal particles in the penultimate preheater stage of the string is reduced by the thus occurring precalcining of the raw material supplied to this stage and may further be regulated in a known way by a controlled slight increase in the raw material supply to the kiln string.

The following are the findings of a calculation of the $NO_x$-emission from a plant operating according to the method of the invention, and the calculations having been made along the guidelines disclosed in the above calculated example illustrating the prior art technique according to DE 3.100.661:

30% of the total nitrogen containing fuel amount of the plant is by way of example fed to the kiln riser pipe thereby eliminating in the latter 0.4 kg NO/ton of clinker, the kiln string emitting only 0.6 kg NO/ton of clinker. Simultaneously 30% of the total fuel amount, e.g. coal, is fed directly to the calciner (compared to the 60% normally supplied thereto) and the calciner receives further from the kiln string almost the same amount of coal which has given off its content of nitrogen in the kiln riser pipe, thereby reducing the $NO_x$-emission from the calciner string accordingly from 0.4 kg to 0.2 kg NO/ton of clinker. The total $NO_x$-emission from the plant thus amounts to 0.6+0.2=0.8 kg NO/ton of clinker compared to the 1.23 kg NO/ton of clinker obtained according to the example on DE 3.100.661 and the 1.4 kg NO/ton of clinker obtained in a corresponding plant without any reduction zone.

BRIEF DESCRIPTION OF THE DRAWING

The accompanying drawing exemplifies in a diagrammatical and non-limiting way a plant for carrying out the method.

DESCRIPTION OF THE PREFERRED EMBODIMENT

A two-string rotary kiln plant comprises a rotary kiln 1 having a material cooler 2 coupled immediately after the kiln—as seen in the movement direction of the raw material flow—and two multistage cyclone preheater strings 18, 19, 20, 21 and 18', 19', 20', 21' respectively. The cyclone stages are mutually connected through smoke gas ducts 15, 15, 17 and 15', 16', 17', respectively, and raw material supply ducts having raw material inlets 24, 25, 26 and 24', 25', 26', respectively. Not shown fans suck the smoke gases upwards through each string and carries them through smoke gas outlets 27 and 27' to smoke gas filters (not shown either), whereupon the purified smoke gases are released to the atmosphere. The preheater string 18-27 (the kiln string) is connected to a kiln riser pipe 8 by its lowermost stage 18, the riser pipe connecting the smoke chamber 23 of the kiln and the lowermost preheater stage 18 shown in the form of a cyclone separator, while the preheater string 18'-27' (the calciner string) is connected to a separate precalciner 4 by its lowermost stage 18' and an exhaust gas duct 8'. The plant construction shown is therefore often referred to as an SLC-plant ("Separate Line Calciner"). combustion air in the form of spent cooler air is fed to the calciner through a duct 3 which at 7 opens into the calciner bottom. Nitrogen containing fuel, preferably coal, is fed to the plant at the lowermost end of the kiln at 6, in the kiln riser pipe at 10 and to the calciner at 5. Preheated raw materials are conveyed through ducts 22 and 22' to the calciner 4 and are carried from the latter together with the exhaust gases through a duct 8' to the cyclone separator 18' in which the precalcined raw materials are separated from the smoke gases and carried through a duct 11 to the kiln 1 for further treatment therein. 14 denotes a branch-off having a control damper 28 for spent cooler air which, through said branch-off, is conveyed to the smoke gas duct 15 connecting the lowermost and the penultimate cyclone stage of the kiln string. Together with the supply of preheated raw materials from the kiln string through a duct 9 to the kiln riser pipe an $NO_x$ reducing zone of a considerable length in the kiln riser pipe and a part of the kiln string proper is established from the fuel inlet 13 for a fuel duct 10 in the riser pipe to the inlet 12 for supplied, spent cooler air. Since substantially more coal is introduced into the kiln riser pipe 8 through the fuel duct 10 than what may be combusted by means of the oxygen present in the riser pipe, the non-combusted NO-reduced coal is separated from the smoke gases together with the partially calcined raw material in the riser pipe in the cyclone separator 18 and carried through the duct 22 to the calciner 4 where the non-combusted coal burns out completely under normal air excess conditions.

I claim:

1. A method for the reduction of nitrogen oxide ($NO_x$) emission from a kiln plant for burning mineral raw materials by the use of a nitrogen-containing solid fuel, comprising the steps of (1) preheating separate portions of said raw material in at least two separate multistage preheater strings, one said string being a kiln string in direct connection with a kiln riser pipe, another said string being a calciner string connected to a separate precalcining zone;

(2) introducing into said precalcining zone heated air from a material cooling zone, said material cooling zone being connected to said kiln and receiving hot treated material from the kiln;

(3) further introducing into said precalcining zone preheated raw material from said kiln string and said calcining string together with nitrogen-containing solid fuel;

(4) calcining said preheated raw material in said precalcining zone by burning fuel with said air;

(5) passing the calcined raw material from the precalcining zone to the kiln and burning said material in said kiln together with air and said fuel;

(6) passing the burned raw material in the form of clinker to said material cooling zone and thence out of the plant as final treated product;

(7) passing $NO_x$-containing combustion gases from the kiln upwardly through a riser pipe in said multistage kiln string and reducing said $NO_x$ to harmless $N_2$ in said riser pipe by adding nitrogen-containing solid fuel to said combustion gases in said riser pipe, said fuel being added in an amount greater than the amount of fuel combustible in the riser pipe by the oxygen in the combustion gases from the kiln and further in an amount constituting from 20% to 50% of the total amount of solid fuel supplied to the plant;

(8) combusting only a portion of said fuel in said riser pipe and causing the nitrogen in said fuel, both combusted and non-combusted, to react with $NO_x$ generated in the kiln to form said harmless $N_2$;

(9) passing non-combusted nitrogen-depleted fuel from said riser pipe to said calcining zone and combusting said nitrogen-depleted fuel and said nitrogen-containing fuel in said calcining zone with said air in the presence of said preheated raw material, thereby reducing $NO_x$ emission from the calcining zone; and

(10) thereby reducing the overall $NO_x$ emission from said kiln plant.

2. A method according to claim 1, including the step of reducing at least a portion of the $NO_x$ in a section of the kiln riser pipe extending between a lowermost preheater stage and a penultimate preheater stage, and thereby establishing in the kiln riser pipe a retention time of sufficient length for the efficient reduction of $NO_x$.

3. A method according to claim 2 including the step of supplying tertiary air to said section of the kiln riser pipe, said tertiary air being supplied as a portion of said air from said material cooling zone.

* * * * *